UNITED STATES PATENT OFFICE.

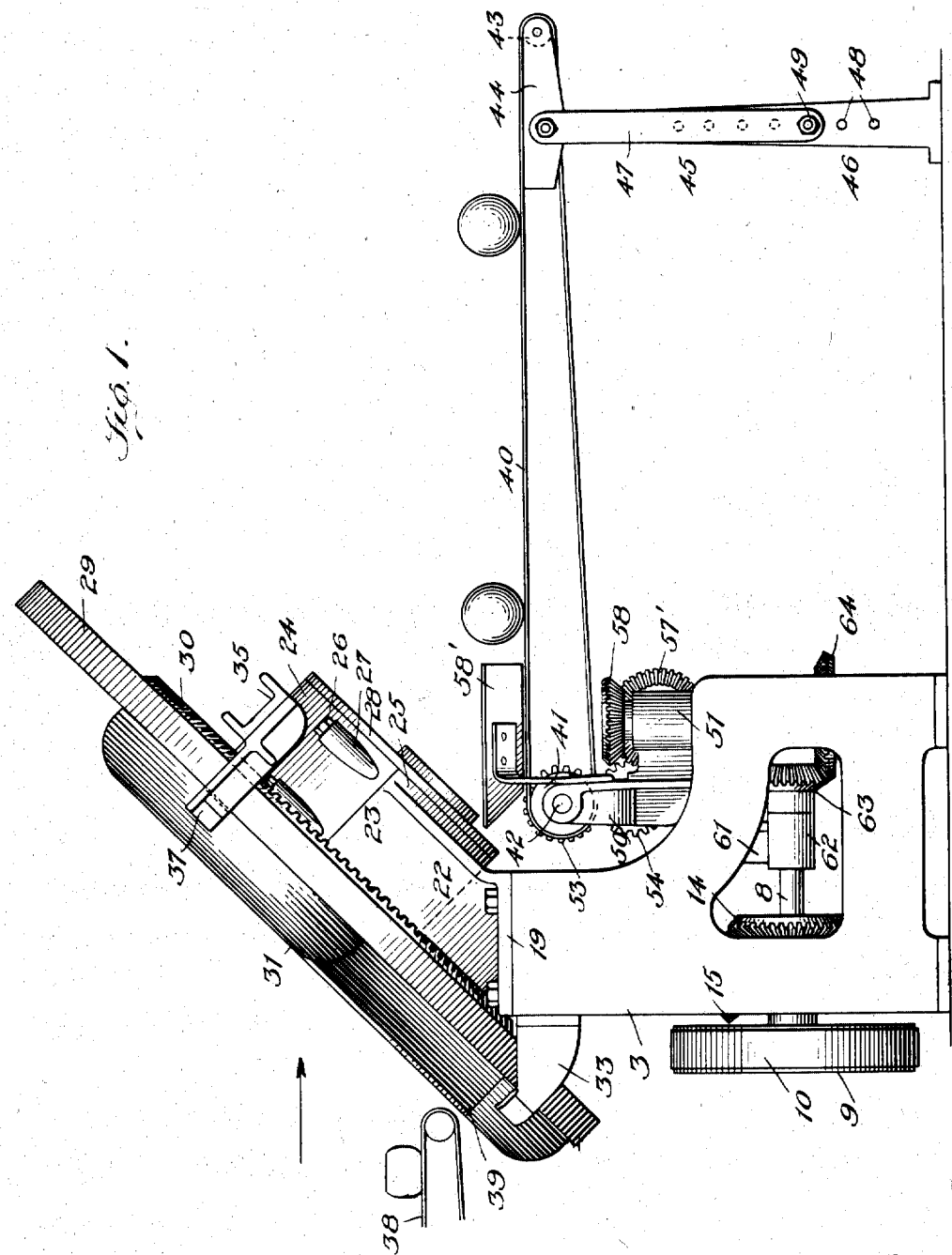

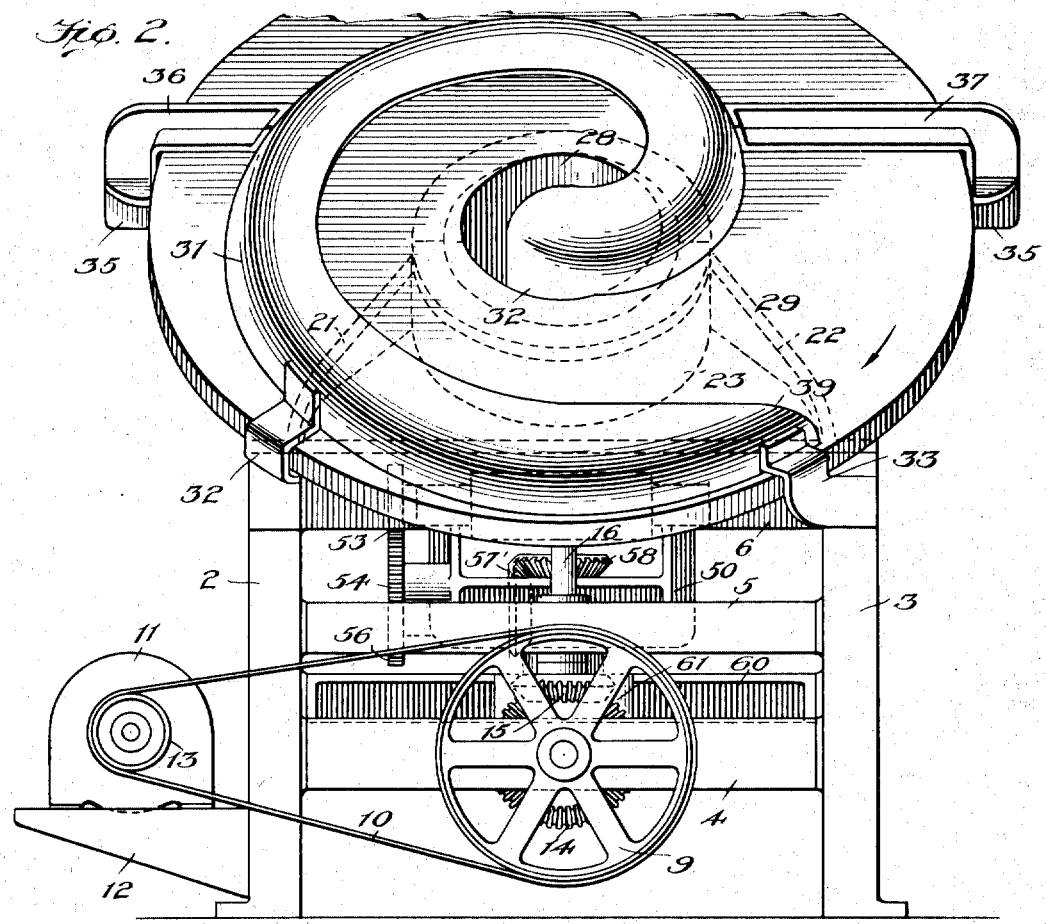
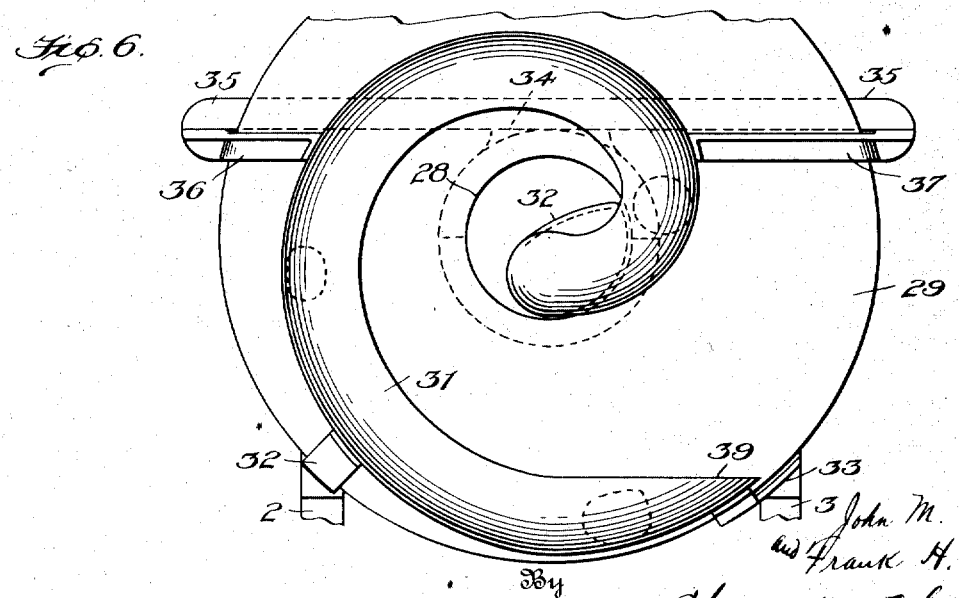

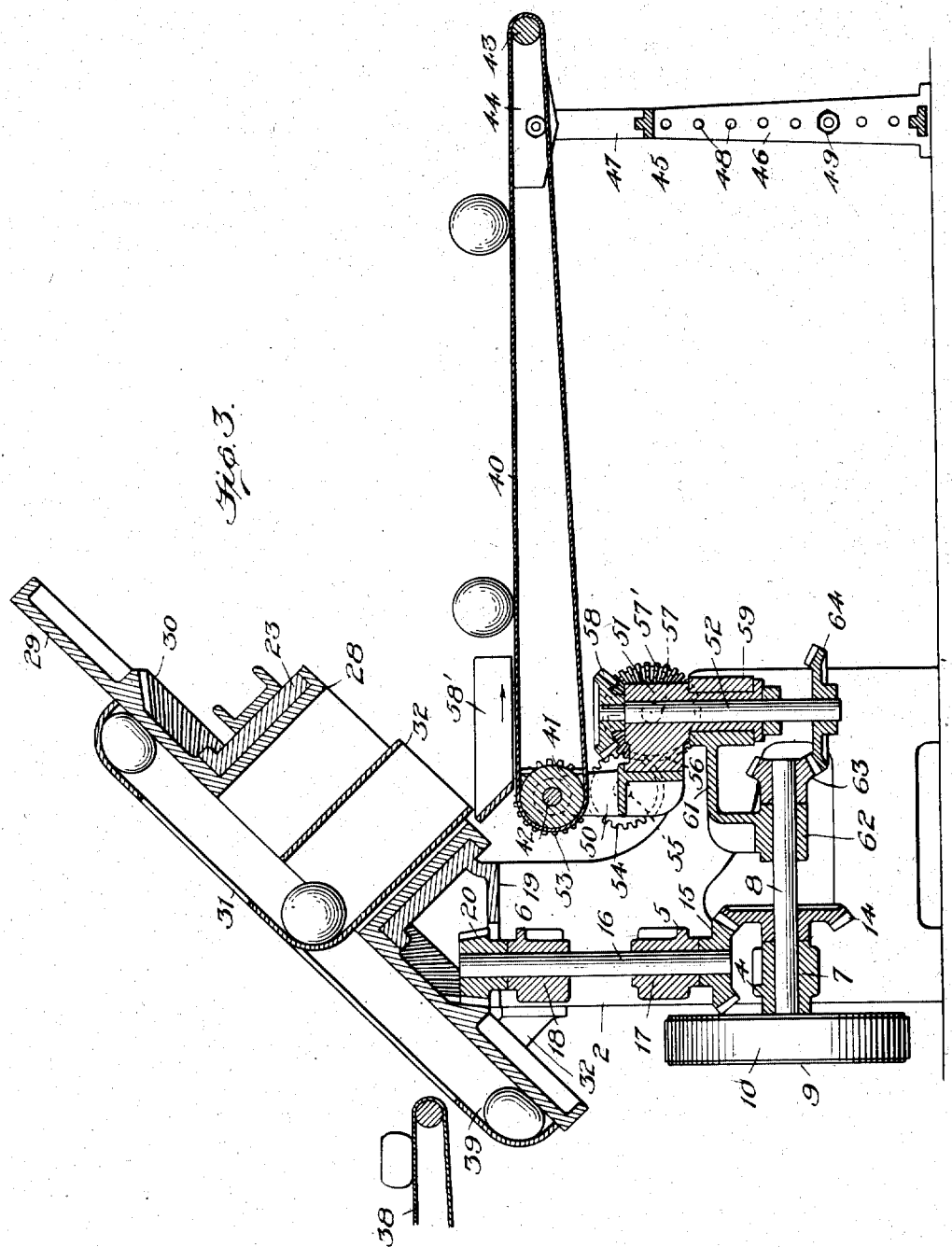

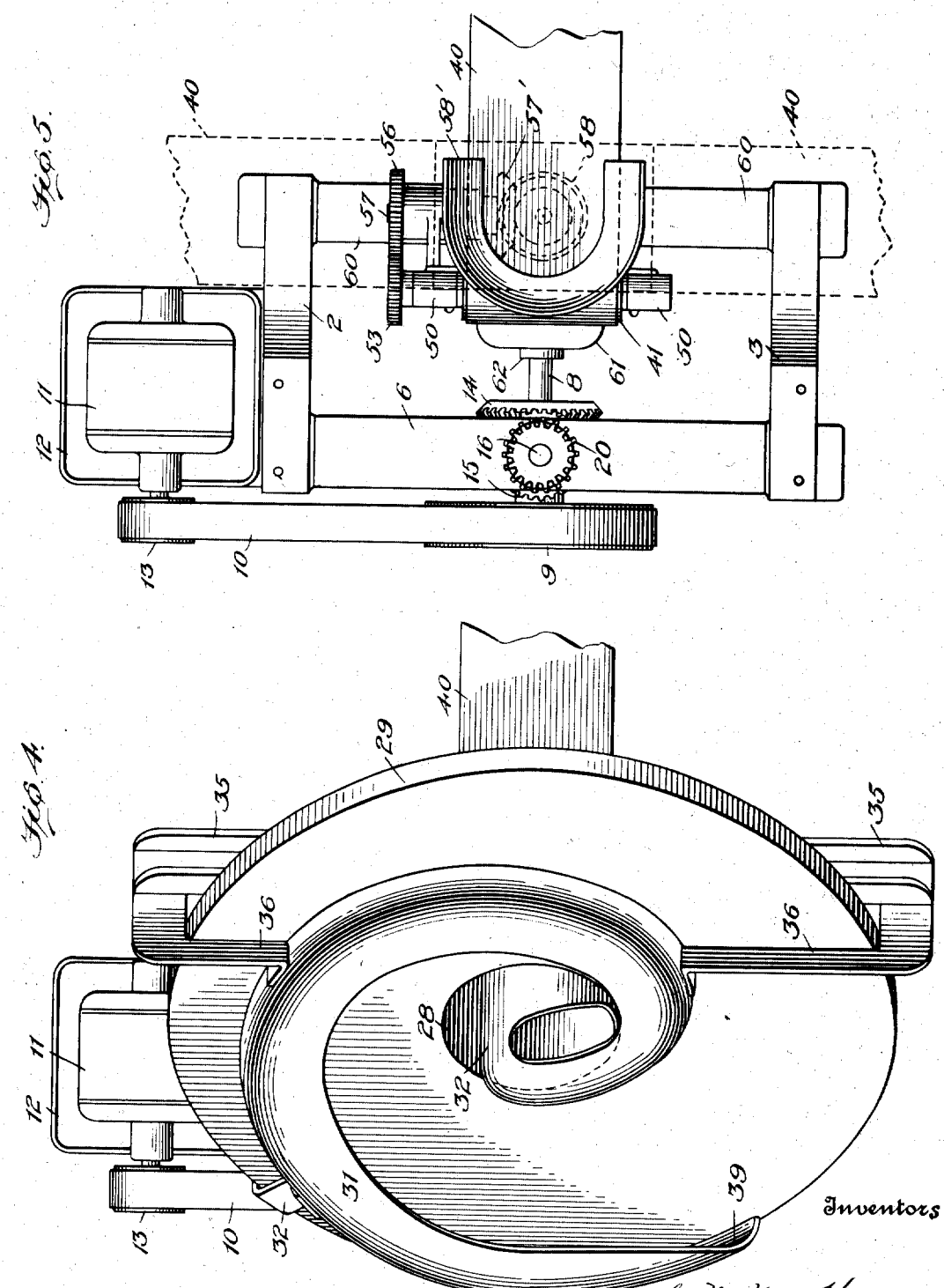

JOHN M. VAN HOUTEN AND FRANK H. VAN HOUTEN, OF BEACON, NEW YORK, ASSIGNORS TO DUTCHESS TOOL COMPANY, OF BEACON, NEW YORK, A CORPORATION OF NEW YORK.

MACHINE FOR MOLDING DOUGH AND LIKE PLASTIC SUBSTANCES.

1,253,443.  Specification of Letters Patent.  Patented Jan. 15, 1918.

Application filed October 23, 1915. Serial No. 57,566.

*To all whom it may concern:*

Be it known that we, JOHN M. VAN HOUTEN and FRANK H. VAN HOUTEN, citizens of the United States, residing at Beacon, in the county of Dutchess and State of New York, have invented certain new and useful Improvements in Machines for Molding Dough and like Plastic Substances; and we do hereby declare the following to be a full, clear, and exact description of the same, reference being had to the accompanying drawings forming part of this specification.

This invention relates to machines for molding dough and like plastic substances, the improvements made by the invention being conveniently embodied in a machine of the type employing a moving surface or carrier for advancing and imparting motion to the dough, in conjunction with a molding and directing trough disposed at an angle to the line of motion of the carrier.

Briefly stated, in the operation of machines of this type, the lumps of dough or of similar plastic substances to be molded are fed into the trough at one end and by the action of the moving carrier, combined with the angularly disposed trough, the lumps of dough are caused to traverse the surface of the carrier with their line of advance at an angle to the line of motion of the carrier. As a result, the lumps of dough are turned over and over on the surface of the carrier and against the surface of the trough with a sort of a screw-like motion which not only molds the substances into the desired form for future handling, but also stretches the outer surface of the material to form a smooth and even skin-like membrane protecting the inner somewhat more spongy mass.

The general object of the invention is to improve the construction and increase the efficiency of molding machines of this character, as will appear from the following detailed description of a construction embodying the features of the invention in a preferred form and afterward pointed out and specified in the claims.

In the drawings:

Figure 1 is a side elevation of a molding machine embodying the present improvements.

Fig. 2 is a front elevation of the same looking in the direction of the arrow 2 of Fig. 1.

Fig. 3 is a section on a vertical plane taken midway through the machine.

Fig. 4 is a top plan view of the machine, taken in a horizontal plane.

Fig. 5 is a plan view with the carrier disk and molding trough removed in order to illustrate more clearly certain of the operating parts.

Fig. 6 is a plan view of the carrier disk and molding trough on a plane substantially parallel with the line of inclination of said parts to the horizontal.

Like characters of reference in the several figures indicate the same parts.

The operating parts of the machine are supported by a suitable frame work, this being of any preferred construction adapted to rest on the floor of the bakery and consisting, in the present instance, of the end uprights or supports 2, 3, connected by horizontal supporting bars 4, 5 and 6, arranged one above the other in the order shown in the drawings. Midway between its ends the lower supporting bar 4 is formed to provide a journal box or bearing 7, in which is mounted for rotation a horizontal drive shaft 8. Drive shaft 8 is provided with a drive pulley 9 to which motion is imparted by a belt 10 having a connection with any suitable source of power. Power to drive shaft 8 may be conveniently taken from a motor 11 supported upon an angle bracket 12 at one side of the frame, and having a drive pulley 13 over which belt 10 passes. The exact form of drive for the shaft 8 is, however, a mere feature of construction and forms no part of the invention. Fixed to the drive shaft 8, is a bevel gear 14 in mesh with a bevel gear 15 whereby motion is imparted to a vertical shaft 16. Vertical shaft 16 is journaled in bearings 17, 18, formed respectively in the horizontal supporting members 5 and 6, and said vertical shaft 16 extends upwardly through an opening in the top horizontal plate 19 of the frame and is provided at its upper end with a drive bevel pinion 20.

Extending inwardly from opposite ends of top plate 19 are arms 21 and 22 which together support a hollow trunnion 23. In the preferred construction, said trunnion 23 is split diametrically to provide opposite sections 24 and 25 which may be rigidly but detachably secured together by bolts 26 extending through openings in lugs 27 on one of the sections, such as 24, and into alined openings in the other section 25. A hollow trunnion of this description forms a supporting journal for the sleeve or hollow hub 28 of the rotatable dough carrier or disk 29, the detachably secured sections 24 and 25 permitting the trunnion to be assembled around the hub. As shown in the drawings the trunnion 23 is held rigidly at an inclination to the horizontal by the arms 21 and 22, thereby supporting the rotatable carrier 29 in a plane inclined to the horizontal. Broadly speaking, the inclination of the carrier to the horizontal is a feature of considerable importance, for the reason that the dough may be deposited on the moving surface near its edge and at the lower end of the inclined plane, and, guided by the molding trough hereinafter described, the dough is carried up the inclined surface and discharged through the central hub of the carrier. Rotary motion is imparted to the carrier or disk 29 by an internal bevel gear 30 on said disk and in mesh with drive pinion 20. Mounted above the disk 29 is the stationary dough molding and directing trough 31. This trough extends substantially in a spiral curve over the surface of the disk 29 from a point on the periphery of the disk and at the lower end of the incline to the hollow hub 28 through which the dough is discharged. The trough is open toward the face of the disk and also toward its axis of rotation, but closed toward the periphery of the disk to resist the centrifugal force on the lumps of dough and prevent them from being thrown off the moving surface. This construction provides a continuous guideway which directs the dough in a path always at an angle to the line of motion of the carrier disk from the lower end of the inclined plane surface up and around the surface of the rotating disk and into the central discharge. During their advance the lumps of dough are thrown against the outer wall of the trough, and turned over and over on the rotating surface in a screw-like movement until their final discharge through the hub 28. In discharging through the hollow hub 28 the dough is guided by the extension 32 of trough 31. The side walls of said extension are closed and project into hub 29. The dough lumps thus guided are discharged through hub 28 with a smooth, even skin-like surface or membrane which protects the more spongy inner mass. Trough 31 is supported in fixed position at its front end by brackets 32, 33, which extend from opposite ends of the horizontal top plate 19. Secured to the flattened face 34 of rear section 24 of the hollow trunnion is an elongated bracket arm 35. Said arm is provided with opposite extensions 36, 37, which turn over the edge of disk 29 and across the upper surface into supporting engagement with the trough.

In Fig. 3 is shown in diagram a conveyer belt 38 for feeding lumps of dough to the inlet at the lower or inlet end 39 of the molding trough 31.

The invention also provides a novel conveyer for carrying away the molded lumps of dough after they have been discharged from the lower end of discharge outlet 32. In the present instance the discharge conveyer is constructed whereby the molded lumps of dough may be directed to any one of a plurality of different points by a quick adjustment of the conveyer so that the machine may be readily adapted to suit varying conditions in the bakery without making it necessary to dismount the machine as a whole and set it up again in another part of the bakery. For this purpose a conveyer belt 40 is provided beneath the discharge 32, with the inner end of the belt passing around a roller 41 on the drive shaft 42 which drives the belt in the direction indicated by the arrow. At its outer end, the belt passes around an idler roll 43 journaled in a stand 44 supported by the vertical uprights 45. Each vertical upright 45 consists preferably of two members 46, 47, one, 46, of which is provided with bolt holes 48 arranged in a vertical line and the other, 47, with a bolt 49, whereby the stand may be raised or lowered to vary the elevation of belt 40. Drive roller 41 is journaled in a bracket 50 having a sleeve 51, which embraces the vertical transmitting shaft 52 and may be turned thereon. Motion is imparted to drive roller 41 by a gear 53 on shaft 42 in mesh with a gear 54 on a parallel shaft 55. Gear 54 in turn meshes with a gear 56 on a shaft 57 and both shafts 55 and 57 are suitably journaled in the revoluble bracket 50. The motion from vertical shaft 52 is transmitted to the train of gears by a bevel pinion 58 mounted on the upper end of said shaft, and in mesh with a bevel gear 57' on shaft 57. It will be noted that gears 53, 54, 56 and 57', respectively, all revolve about horizontal axes, which axes may be shifted as desired by turning supporting bracket 50 about vertical shaft 52. Vertical shaft 52, however, is also the driving axis for the train of gears, by reason of the pinion 58 being in mesh with gear 57', hence by shifting stand 44 the angular position of the belt 40 may be shifted on axis 52 without in any way affecting the drive of the belt. In the present instance the position of the belt may be adjusted to any point within an arc of 180°, as shown by dotted lines in Fig. 5 of the drawings. Secured in any suitable manner to bracket 50 and above belt 40 is a trough 58' which directs the discharge from outlet 32 on to belt 40.

Shaft 52 is journaled in a vertical bearing 59 formed in the horizontal supporting brace 60 which connects the vertical side members 2 and 3 of the frame. Supported by horizontal brace 60 is an angle bracket 61 provided with a bearing sleeve 62 in which horizontal drive shaft 8 is journaled. The motion from drive shaft 8 is transmitted to vertical shaft 52 by a bevel pinion 63 in mesh with a bevel gear 64 on the lower end of shaft 52.

What is claimed is:—

1. In an apparatus for molding dough and like plastic substances, the combination of a rotating dough-supporting surface substantially circular in shape disposed in a plane inclined to the horizontal, a discharge outlet extending centrally through the dough-supporting surface, an inlet located adjacent to its periphery and at the lower end of the inclined plane, and a stationary molding and directing trough traversing said dough-supporting surface from the inlet to the discharge.

2. In an apparatus for molding dough and like plastic substances, the combination of a rotating dough-supporting surface substantially circular in shape disposed in a plane inclined to the horizontal, a discharge outlet extending centrally through the dough-supporting surface, an inlet located adjacent to its periphery and at the lower end of the inclined plane, and a substantially spiral stationary molding and directing trough traversing said dough supporting surface from the inlet to the discharge.

3. In an apparatus for molding dough and like plastic substances, the combination of a rotating dough supporting surface, substantially circular in shape, disposed in a plane inclined to the horizontal, a discharge outlet extending centrally through the dough-supporting surface, an inlet located adjacent its periphery and at the lower end of the inclined plane, and a stationary molding trough mounted over the dough supporting surface and arranged to direct the dough in a path disposed at an angle to the line of motion of said carrier and from the periphery of said dough supporting surface to the central discharge outlet.

4. In an apparatus for molding dough and like plastic substances, the combination of a rotating carrier having a flat dough supporting surface supported in a plane inclined to the horizontal, a discharge outlet located substantially at the center of rotation of the carrier and extending through the latter, an inlet adjacent its edge and located at the lower end of the inclined plane, means for imparting continuous uniform rotary motion to said carrier, and a stationary molding trough disposed at an angle to the line of motion to the carrier and traversing the surface of the carrier from the inlet to the discharge.

5. In an apparatus for molding dough and like plastic substances, the combination of a rotating carrier having a flat dough supporting surface supported in a plane inclined to the horizontal, a discharge outlet located substantially at the center of rotation of the carrier, and extending through the latter, an inlet adjacent its edge and located at the lower end of the inclined plane, and a substantially spiral molding trough mounted over the dough supporting surface of the carrier and adapted to direct the dough in a continuous path disposed at an angle to the line of motion of the carrier.

6. In an apparatus for molding dough and like plastic substances, the combination of a carrier disk having a central hollow sleeve which forms a discharge outlet, a hollow trunnion for supporting the carrier disk in a plane inclined to the horizontal, means for imparting continuous, uniform rotary motion to said carrier disk and a molding trough disposed at an angle to the line of motion of the carrier disk and traversing its surface from the periphery to the central discharge.

7. In an apparatus for molding dough and like plastic substances, the combination of a carrier disk having a central hollow sleeve which forms a discharge outlet, a hollow trunnion embracing said sleeve and arranged to support the carrier disk in a plane inclined to the horizontal, means for imparting continuous, uniform rotary motion to said carrier disk, and a substantially spiral molding trough disposed at an angle to the line of motion of the carrier disk and traversing its surface from the periphery to the central discharge.

8. In an apparatus for molding dough and like plastic substances, the combination of a carrier disk having a central hollow sleeve which forms a discharge outlet, means for supporting said carrier disk in a plane inclined to the horizontal, means for imparting continuous, uniform rotary motion to the carrier disk, and a molding trough traversing the surface of the carrier disk from the periphery and projected into the hollow sleeve of the disk whereby the dough is guided by the trough from the periphery of the carrier disk through the discharge outlet.

9. In an apparatus for molding dough and like plastic substances, the combination of a carrier disk having a central hollow sleeve which forms a discharge outlet, means for supporting said carrier disk in a plane inclined to the horizontal, means for imparting continuous, uniform rotary motion to the carrier disk and a substantially-spiral molding trough traversing the surface of the disk from the periphery and having an extension projected into the hollow sleeve of the disk, whereby the dough is guided by the trough from the periphery of the carrier disk through the discharge outlet.

10. In an apparatus for molding dough and like plastic substances, the combination of a carrier disk having a central hollow sleeve which forms a discharge outlet, a supporting frame for the disk including a hollow trunnion inclined to the horizontal and embracing said central sleeve, gearing connections mounted in the frame for driving the carrier disk at a continuous uniform speed, and a molding trough disposed at an angle to the line of motion of the carrier disk and traversing its surface from the periphery to the central discharge.

11. In an apparatus for molding dough and like plastic substances, the combination of a carrier disk having a central hollow sleeve which forms a discharge outlet, a frame, a hollow trunnion supported in a plane inclined to the horizontal by arms extending from opposite ends of the frame, said trunnion embracing the sleeve of the carrier disk and supporting the disk in a plane inclined to the horizontal, gearing connections mounted in the frame for driving the carrier disk at a continuous uniform speed, and a molding trough disposed at an angle to the line of motion of the carrier disk and traversing its surface from the periphery to the central discharge.

12. In an apparatus for molding dough and like plastic substances, the combination of a carrier disk having a central hollow sleeve which forms a discharge outlet, a frame, a hollow trunnion supported in a plane inclined to the horizontal by arms extending from opposite ends of the frame, said trunnion embracing the sleeve of the carrier disk and supporting the disk in a plane inclined to the horizontal, gearing connections mounted in the frame for driving the carrier disk at a continuous uniform speed, a molding trough disposed at an angle to the line of motion of the carrier disk and traversing its surface from the periphery to the central discharge, brackets extending from opposite ends of the frame, and a trunnion supported bracket having opposite extensions turning over the edge of the disk and across its upper surface into engagement with portions of the trough, said brackets mutually supporting the trough in fixed position.

13. In an apparatus for molding dough and like plastic substances, the combination of a carrier disk having a central hollow sleeve which forms a discharge outlet, a frame, a hollow trunnion supported in a plane inclined to the horizontal by arms extending from opposite ends of the frame, said trunnion embracing the sleeve of the carrier disk and supporting the disk in a plane inclined to the horizontal, gearing connections mounted in the frame for driving the carrier disk at a continuous uniform speed, a substantially spiral molding trough traversing the surface of the disk from the periphery and having an extension projected into the hollow sleeve of the disk, whereby the dough is guided by the trough from the periphery of the carrier disk through the discharge outlet, brackets extending from opposite ends of the frame, and a trunnion supported bracket having opposite extensions turning over the edge of the disk and across its upper surface into engagement with portions of the trough, said brackets mutually supporting the trough in fixed position.

14. In an apparatus for molding dough and like plastic substances, the combination of a frame, a carrier disk having a central hollow hub which forms a discharge outlet, a hollow trunnion supported by arms extending from opposite ends of the frame, said trunnion forming a supporting journal for the carrier disk, gearing connections mounted in the frame for driving the carrier disk at a continuous uniform speed, and a molding trough disposed at an angle to the line of motion of the carrier disk.

15. In an apparatus for molding dough and like plastic substances, the combination of a frame, a carrier disk having a central hollow hub which forms a discharge outlet, a hollow trunnion supported by arms extending from opposite ends of the frame, said trunnion forming a supporting journal for the carrier disk, gearing connections mounted in the frame for driving the carrier disk at a continuous uniform speed, a substantially spiral molding trough traversing the surface of the disk from the periphery and having an extension projected into the hollow hub of the disk, whereby the dough is guided by the trough from the periphery of the carrier disk through the discharge outlet, brackets extending from opposite ends of the frame, and a trunnion supported bracket having opposite extensions turning over the edge of the disk and across its upper surface into engagement with portions of the trough, said brackets mutually supporting the trough in fixed position.

16. In an apparatus for molding dough and like plastic substances, the combination of a carrier disk having a central opening with means for operating the carrier disk, and a molding trough traversing the surface of the disk from the periphery and having an extension projected into the central opening, whereby dough is guided by the molding trough from the periphery of the carrier disk across its surface and discharged through its central opening.

17. In an apparatus for molding dough and like plastic substances, the combination of a carrier disk having a central opening with means for operating the carrier disk, and a molding trough disposed at an angle to the line of motion of the carrier disk, said trough traversing the surface of the disk from the periphery and having an extension projected into the central opening whereby dough is guided by the molding trough from the periphery of the carrier disk across its surface and discharged through its central opening.

18. In an apparatus for molding dough and like plastic substances, the combination of a carrier disk having a central opening with means for operating the carrier disk, and a substantially spiral molding trough traversing the surface of the disk from the periphery and having an extension projected into the central opening, whereby dough is guided by the molding trough from the periphery of the carrier disk across its surface and discharged through its central opening.

19. In an apparatus for molding dough and like plastic substances, the combination of a carrier disk, having a central opening with means for operating the carrier disk, and a substantially spiral molding trough traversing the surface of the disk from the periphery and an extension with closed side walls projected into the central opening, whereby dough is guided by the molding trough from the periphery of the carrier disk across its surface and discharged through its central opening.

JOHN M. VAN HOUTEN.
FRANK H. VAN HOUTEN.

Witnesses:
  ROY T. URQUHART,
  JOHN DINWIDDIE.